L. F. HUBERT.
BARB WIRE REELING DEVICE.
APPLICATION FILED FEB. 5, 1919.
1,320,232.
Patented Oct. 28, 1919.
2 SHEETS—SHEET 1.
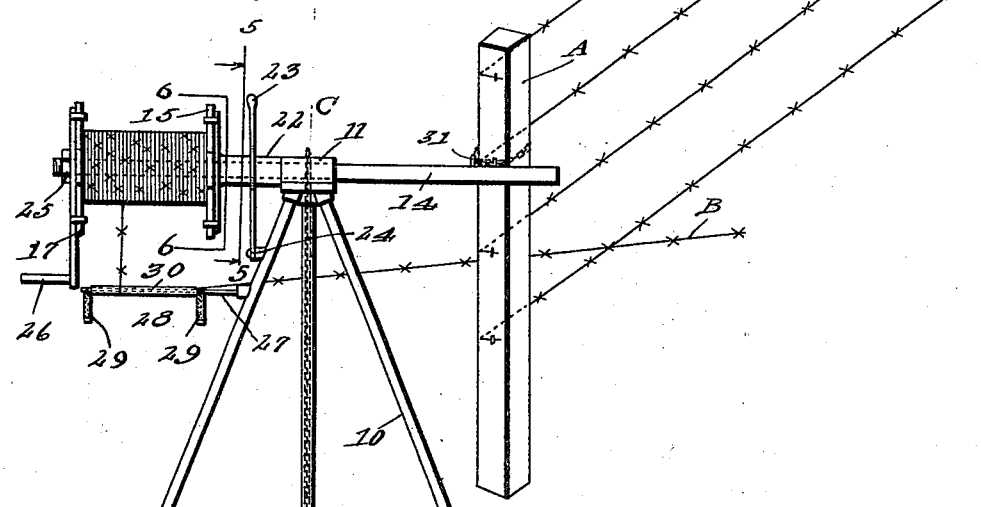
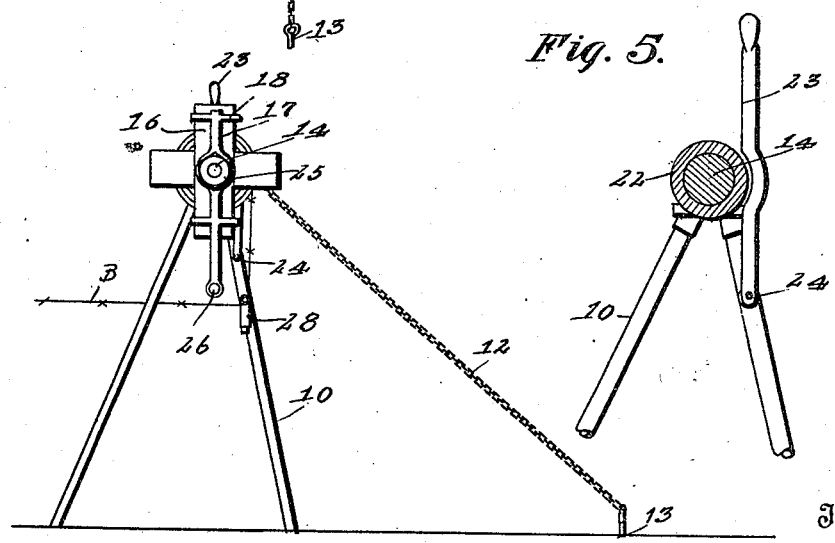
Witnesses
K. A. Thomas.
Inventor
L. F. Hubert
By Victor J. Evans
Attorney

L. F. HUBERT.
BARB WIRE REELING DEVICE.
APPLICATION FILED FEB. 5, 1919.

1,320,232.

Patented Oct. 28, 1919.
2 SHEETS—SHEET 2.

Witnesses
H. A. Thomas

Inventor
L. F. Hubert.

By Victor J. Evans
Attorney

UNITED STATES PATENT OFFICE.

LEONARD F. HUBERT, OF OGDEN, KANSAS.

BARB-WIRE-REELING DEVICE.

1,320,232. Specification of Letters Patent. Patented Oct. 28, 1919.

Application filed February 5, 1919. Serial No. 275,133.

*To all whom it may concern:*

Be it known that I, LEONARD F. HUBERT, a citizen of the United States, residing at Ogden, in the county of Riley and State of Kansas, have invented new and useful Improvements in Barb-Wire-Reeling Devices, of which the following is a specification.

This invention relates to winding and reeling devices, particularly to those designed for use in connection with fence wire, especially barb wire, and has for its object the provision of a reel supporting device adapted for disposition upon the ground or upon a wagon if desired, and which carries a shaft having mounted thereon holding arms adapted for embracing engagement with the original reel upon which the wire is wound, one holding member being provided with a handle whereby the reel may be rotated, and the other holding member having associated therewith a braking mechanism for preventing too rapid unwinding of the wire.

Another object is the provision of a device of this character which is supported from a tripod, which may be readily positioned upon the ground at the desired location, and which is effectively braced by a guy chain which may be secured to a stake or the like, driven into the ground.

A further object is the provision of a device of this character in which the tripod or other supporting member carries a guide member in the nature of a bracket arm having disposed thereon rollers over which the fence wire is pulled in either winding or unwinding the reel.

An additional object is the provision of a device of this character which will be comparatively simple and inexpensive in manufacture, highly efficient and durable in use, and a general improvement in the art.

With the above and other objects and advantages in view, the invention consists in the details of construction to be hereinafter more fully described and claimed, and illustrated in the accompanying drawings, in which—

Figure 3:
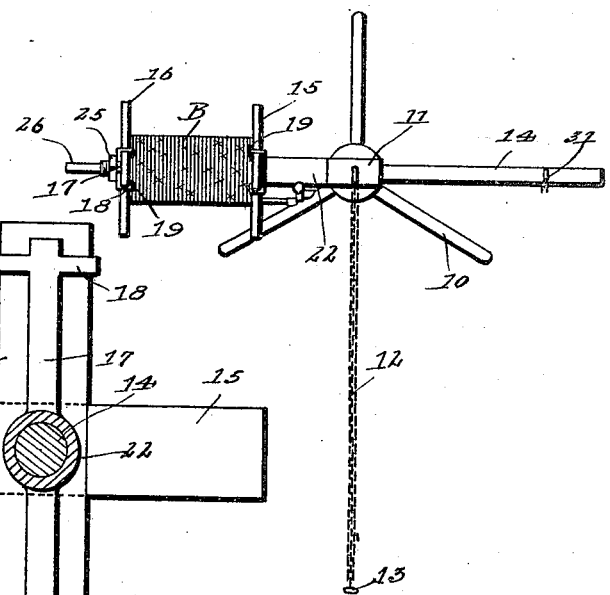
Figure 6:
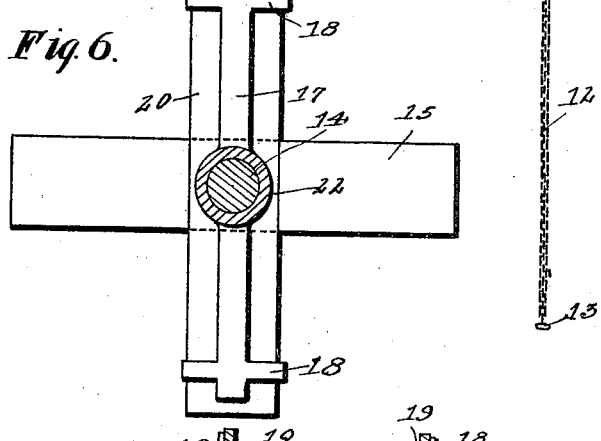
Figure 4:
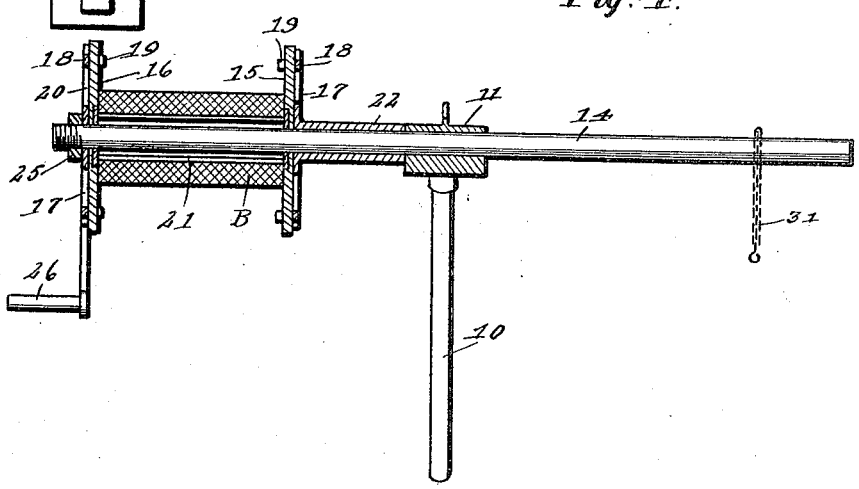

Figure 1 is a side elevation of the device showing it associated with a fence post and fence wire, Fig. 2 is an end elevation, Fig. 3 is a plan view, Fig. 4 is a longitudinal sectional view, Fig. 5 is a cross sectional view on the line 5—5 of Fig. 1, showing the brake mechanism, and Fig. 6 is a cross sectional view on the line 6—6 of Fig. 1, showing the reel holding member.

Referring more particularly to the drawings, the letter A designates a fence post, B designates a length of barb wire, and C designates my device as a whole.

In carrying out my invention I provide a tripod 10 having its upper end formed as a bearing head 11 to which is secured a chain 12 connected with a suitable stake 13 driven into the ground at the desired location whereby the tripod will be guyed and held rigid. Extending through the bearing head 11 is a horizontally disposed shaft 14 upon which are rotatably mounted reel holding members 15 and 16, each of which comprises a bar 17 having secured thereon transversely extending arms 18 having inwardly extending end portions 19 adapted for engagement with the cross-like ends 20 of the reel 21 upon which the wire B is originally wound as it comes from the factory. Secured to the holding member 15 is a cylindrical sleeve 22 which has its free end abutting against the bearing head 11. This sleeve 22 serves as a brake drum and is engaged by a lever 23 pivoted as at 24 upon the tripod 10. The end of the shaft 14 is threaded, as shown, and has engaged thereon a nut 25 whereby the reel 21 and holding members 15 and 16 will be clamped in assembled position. The holding member 16 has secured thereon a handle 26 by means of which the reel may be rotated.

Secured to the tripod 10 is a laterally extending bracket 27 upon which is secured a U-shaped member 28 having rolls 29 and 30 journaled upon its arms and bight portion, respectively. The bracket 27 is so positioned with respect to the reel 21 that the wire B in being wound onto the reel or being unwound, as the case may be, will engage and be guided by the rolls 29 and 30.

In the use of the device, the tripod is set up preferably adjacent a fence post and the stake 13 driven into the ground and the chain 12 connected therewith for properly guying the tripod. It may be found advisable to make use of an auxiliary chain 31 which is secured to the shaft 14 at one end and looped about the fence post A and having its other end detachably connected with the shaft. This auxiliary chain simply serves as additional securing means for holding the device rigid. The holding member 15 having the sleeve 22 is then slid onto the shaft and one of the arms of its cross-like ends engaged within the arms 18 of the holding member. The holding member 16 is then slid onto the shaft and engaged with the other end of the reel in the same manner. The nut 25 is then threaded upon the shaft and the device is ready for use. By rotating the reel by means of the handle 26 the wire may be wound onto the reel in a simple and efficient manner. When it is desired to unwind wire from the reel it is of course unnecessary to rotate the device manually as the tension exerted upon the wire will be sufficient to accomplish this result. When unwinding, however, the operator may control the speed of rotation of the reel by means of the lever 23 engaging the brake drum or sleeve 22.

While I have shown my device associated with a fence post and the ground, it will be understood that it may be mounted upon a wagon in substantially the same manner.

From the foregoing description and a study of the drawings, it will be apparent that I have thus provided a simple device of the character described and purpose specified, which will efficiently perform all the functions for which it is intended and which will be a distinct improvement in the art.

Having thus described my invention, I claim:

A device of the character described comprising a supporting tripod, a head on the upper end thereof, a horizontal shaft extending through and secured within said head, a flexible member secured at one end to one end of said shaft and engageable about a fence post, a drum mounted for rotation on said shaft adjacent said head, the other end of said shaft being adapted to revolubly support a reel, means carried by said drum and engaging the reel, means for rotating the reel, a flexible guy member connected with said head and adapted for engagement with a fixed support, and a guide roller carried by one leg of the tripod and disposed beneath the reel.

In testimony whereof I affix my signature.

LEONARD F. HUBERT.

Copies of this patent may be obtained for five cents each, by addressing the "Commissioner of Patents. Washington, D. C."